Figures 1, 2:
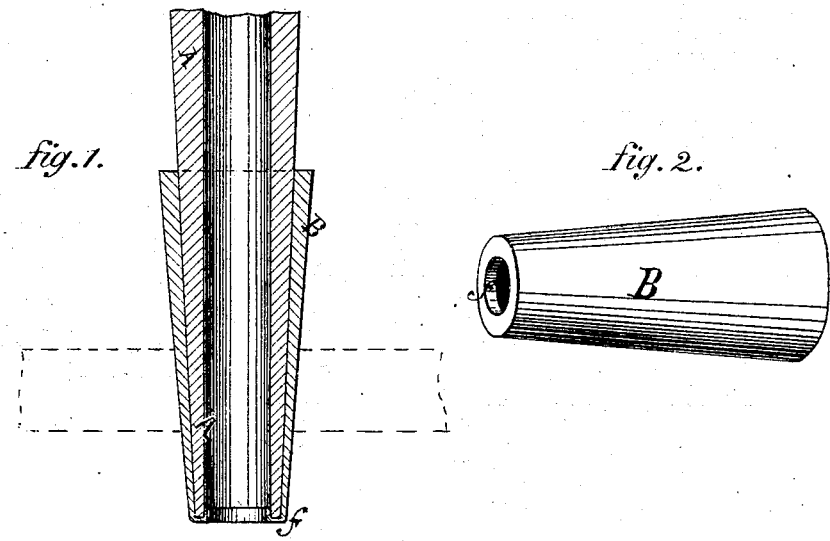

O. NETZOW & JOHN T. HECK.
Bushes for Faucets.

No. 123,789.  Patented Feb. 20, 1872.

Witnesses:
Victor Hagmann.
George Ritter

Inventors:
Otto Netzow
John F. Heck.

123,789

UNITED STATES PATENT OFFICE.

OTTO NETZOW AND JOHN F. HECK, OF BALTIMORE, MARYLAND.

IMPROVEMENT IN BUSHES FOR FAUCETS.

Specification forming part of Letters Patent No. 123,789, dated February 20, 1872.

SPECIFICATION.

We, OTTO NETZOW and JOHN F. HECK, of the city of Baltimore, in the State of Maryland, have invented certain Improvements, of which the following is a specification:

*Description of the Accompanying Drawing.*

Figure 1 is a vertical transverse section, showing the method of attaching my invention to the cock or faucet. Fig. 2 is a plan of the same.

My invention relates to an improvement in elastic bushings for cocks or faucets used in drawing liquids.

A is that portion of the faucet which is inserted in the cock or other receptacle of fluid. B is an elastic bushing or thimble, which is conical, truncated, and cylindrical, and which increases gradually in thickness from its smaller to its larger end; the smaller end projecting across the periphery of the faucet laterally, and then turning inwardly in a direction parallel to the faucet while fitting closely against the inner side or interior thereof, thereby forming a shoulder, square, or elbow, $f$, at the smaller end of the elastic bushing, which latter is designed to prevent said bushing from sliding during the operation of inserting the cock or faucet, which defect has existed in all similar devices which have hitherto obtained.

We hereby disclaim the improvement of T. W. Bartholomew, patented February 7, 1871, as an improvement in "bushes for faucets," our invention being designed as an improvement upon said device.

*Claim.*

As an article of manufacture, the elastic, conical, truncated, rubber bushing or thimble, with the shoulder $f$, to be applied to cocks or faucets, substantially as specified.

OTTO NETZOW.
JOHN F. HECK.

Witnesses:
   HENDRIC M. FR. STAMP,
   J. SCONNING.